US012801982B2

(12) United States Patent
Jain et al.

(10) Patent No.: US 12,801,982 B2
(45) Date of Patent: Nov. 17, 2026

(54) SYNCHRONIZATION OF COMPUTE ELEMENTS EXECUTING STATICALLY SCHEDULED INSTRUCTIONS FOR A MACHINE LEARNING ACCELERATOR

(71) Applicant: SiMa Technologies, Inc., San Jose, CA (US)

(72) Inventors: Saurabh Jain, San Jose, CA (US); Subba Rao Venkata Kalari, Cupertino, CA (US); Sergey Vakulenko, Campbell, CA (US)

(73) Assignee: SiMa Technologies, Inc., San Jose, CA (US)

( * ) Notice: Subject to any disclaimer, the term of this patent is extended or adjusted under 35 U.S.C. 154(b) by 1019 days.

(21) Appl. No.: 17/958,356

(22) Filed: Oct. 1, 2022

(65) Prior Publication Data

US 2024/0112076 A1 Apr. 4, 2024

(51) Int. Cl.
*G06N 20/00* (2019.01)
*G06F 9/38* (2018.01)
*G06F 9/52* (2006.01)

(52) U.S. Cl.
CPC ........... *G06N 20/00* (2019.01); *G06F 9/3802* (2013.01); *G06F 9/522* (2013.01)

(58) Field of Classification Search
CPC ............................... G06F 9/3802; G06F 9/522
See application file for complete search history.

(56) References Cited

U.S. PATENT DOCUMENTS 7,774,531 B1 8/2010 Karlsson
7,774,552 B1 8/2010 Cypher et al.
(Continued)

FOREIGN PATENT DOCUMENTS

CA 3021416 A1 * 4/2019 ............. G06F 9/462
CA 3021407 C * 12/2020 ......... G06F 9/30101
(Continued)

OTHER PUBLICATIONS

Endrift, Cycle Counting, Memory Stalls, Prefetch and Other Pitfalls, Jun. 27, 2015, https://mgba.io/2015/06/27/cycle-counting-prefetch/ (Year: 2015).*
(Continued)

*Primary Examiner* — Lewis A Bullock, Jr.
(74) *Attorney, Agent, or Firm* — Fenwick & West LLP

(57) ABSTRACT

A machine learning accelerator (MLA) implemented on a semiconductor die includes a computing mesh of interconnected compute elements that includes storage elements (SEs) and processing elements (PEs). The compute elements execute a program of instructions to implement a machine learning network according to a static schedule for execution of the instructions. The instructions include data transfer instructions and compute instructions. The MLA includes a memory interface to off-chip memory. The MLA fetches instructions for the PEs from the off-chip memory, and the MLA transfers data between the SEs and the off-chip memory. A sync detector determines, for each compute element, whether sufficient data and instructions are available for continued operation of the compute element according to the static schedule. It generates a sync request if sufficient data and/or instructions are not available. A sync controller suspends operation of the computing mesh in response to the sync request.

18 Claims, 14 Drawing Sheets

(56) References Cited

U.S. PATENT DOCUMENTS

| | | | |
|---|---|---|---|
| 9,928,460 | B1 | 3/2018 | Nowatzyk et al. |
| 10,705,998 | B1 * | 7/2020 | Wilkinson .......... G06F 13/4027 |
| 10,810,784 | B1 | 10/2020 | Rai et al. |
| 11,321,607 | B2 | 5/2022 | Shah et al. |
| 11,354,570 | B2 | 6/2022 | Shah et al. |
| 11,403,519 | B2 | 8/2022 | Shah et al. |
| 11,886,981 | B2 * | 1/2024 | Shah .................... G06N 3/0464 |
| 12,333,351 | B2 * | 6/2025 | Shah ......................... G06F 9/52 |
| 2003/0141434 | A1 | 7/2003 | Ishikawa et al. |
| 2004/0103251 | A1 | 5/2004 | Alsup |
| 2005/0086451 | A1 | 4/2005 | Yates, Jr. et al. |
| 2011/0078697 | A1 * | 3/2011 | Smittle ................. G06F 9/3836 718/104 |
| 2011/0199391 | A1 | 8/2011 | Olsson et al. |
| 2012/0084238 | A1 | 4/2012 | Kristal et al. |
| 2014/0164748 | A1 | 6/2014 | Dundas |
| 2019/0004878 | A1 | 1/2019 | Adler et al. |
| 2019/0018815 | A1 | 1/2019 | Fleming et al. |
| 2019/0042920 | A1 | 2/2019 | Akin et al. |
| 2019/0076031 | A1 | 3/2019 | Valys et al. |
| 2019/0155768 | A1 | 5/2019 | Wilkinson et al. |
| 2019/0273662 | A1 | 9/2019 | Mwanje et al. |
| 2019/0286973 | A1 | 9/2019 | Kovvuri et al. |
| 2019/0303346 | A1 | 10/2019 | Brewer |
| 2019/0325303 | A1 | 10/2019 | Daga et al. |
| 2019/0391796 | A1 | 12/2019 | Brady et al. |
| 2020/0007342 | A1 | 1/2020 | Liem et al. |
| 2020/0012536 | A1 | 1/2020 | Lacey et al. |
| 2020/0012537 | A1 * | 1/2020 | Lacey ................... H04L 65/104 |
| 2020/0073830 | A1 | 3/2020 | Verrilli et al. |
| 2020/0090383 | A1 | 3/2020 | Dwivedi |
| 2020/0133914 | A1 | 4/2020 | Wilkinson et al. |
| 2020/0150713 | A1 | 5/2020 | Knowles et al. |
| 2020/0210365 | A1 * | 7/2020 | Wilkinson .......... G06F 13/4027 |
| 2021/0124626 | A1 | 4/2021 | Bittner et al. |
| 2021/0201526 | A1 | 7/2021 | Moloney et al. |
| 2021/0216464 | A1 | 7/2021 | Uhrenholt et al. |
| 2021/0271527 | A1 * | 9/2021 | Wilkinson .......... G06F 9/30087 |
| 2021/0312322 | A1 * | 10/2021 | Shah ..................... G06F 9/3836 |
| 2021/0326173 | A1 * | 10/2021 | Shah ..................... G06F 9/3836 |
| 2021/0326189 | A1 * | 10/2021 | Shah ........................ G06N 3/10 |
| 2022/0198318 | A1 * | 6/2022 | Kalari ...................... G06N 3/04 |
| 2022/0357984 | A1 * | 11/2022 | Kotler ..................... G06F 9/544 |
| 2026/0179259 | A1 * | 6/2026 | Dunne ...................... G06T 9/00 |

FOREIGN PATENT DOCUMENTS

| | | | | |
|---|---|---|---|---|
| CA | 3151195 | A1 * | 4/2021 | ........... G06F 9/4806 |
| WO | WO-0033183 | A1 * | 6/2000 | ........... G06F 9/3888 |

OTHER PUBLICATIONS

ElectricalEngineering (alex.forencich), Inside a CPU, what happens in a single clock cycle?, May 9, 2018, https://electronics.stackexchange.com/questions/373417/inside-a-cpu-what-happens-in-a-single-clock-cycle (Year: 2019).*

AWS, Suspending and Resuming a Single-Core MIPS-Based Processor for Power Saving, Jun. 23, 2010, https://s3-eu-west-1.amazonaws.com/downloads-mips/mips-documentation/login-required/ suspending_and_resuming_single-core_mips_based_processor_for_power_saving.pdf (Year: 2010).*

Washington.edu, MIPS Single Cycle Implementation, Jul. 18, 2014, https://web.archive.org/web/20140718165132/http://courses.cs.washington.edu/courses/cse378/04wi/lectures/single-cycle.html (Year: 2014).*

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Chen et al. "DianNao: A Small-Footprint High-Throughput Accelerator for Ubiquitous Machine-Learning;" ACM SIGARCH Computer Architecture News, vol. 42, Issue 1, pp. 269-284, Mar. 5, 2014 (Mar. 5, 2014) Retrieved on Jul. 25, 2021 (Jul. 25, 2021) from <https://dl.acm.org/doi/abs/10.1145/2654822.2541967>.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

International Search Report and Written Opinion, Patent Cooperation Treaty Application No. PCT/US2021/025001, Jun. 10, 2021, 14 pages.

International Search Report and Written Opinion, Patent Cooperation Treaty Application No. PCT/US2021/027787, Aug. 25, 2021, 18 pages.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

* cited by examiner

SYNCHRONIZATION OF COMPUTE ELEMENTS EXECUTING STATICALLY SCHEDULED INSTRUCTIONS FOR A MACHINE LEARNING ACCELERATOR

BACKGROUND

1. Technical Field

This disclosure relates generally to the implementation of machine learning networks on hardware and more particularly to the synchronization of compute elements executing statically scheduled instructions.

2. Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether or to what confidence level objects are present within the images.

Machine learning networks typically require the handling of a large volume of data and the execution of a large number of computations. As a result, they are commonly implemented in compute facilities with access to significant resources, such as in the cloud or on server clusters. There can be many advantages if the machine learning network was instead embedded on edge devices, such as combined in a camera system. However, many types of edge devices, such as cameras, have resource limitations. They may be limited in memory, processing capability, power consumption, etc. As a result, on-chip compute elements may be simplified to conserve resources, but this may give rise to a need to synchronize the operation of these elements.

BRIEF DESCRIPTION OF THE DRAWINGS

Embodiments of the disclosure have other advantages and features which will be more readily apparent from the following detailed description and the appended claims, when taken in conjunction with the example embodiments in the accompanying drawings, in which:

DETAILED DESCRIPTION OF THE PREFERRED EMBODIMENTS

Figure 1:
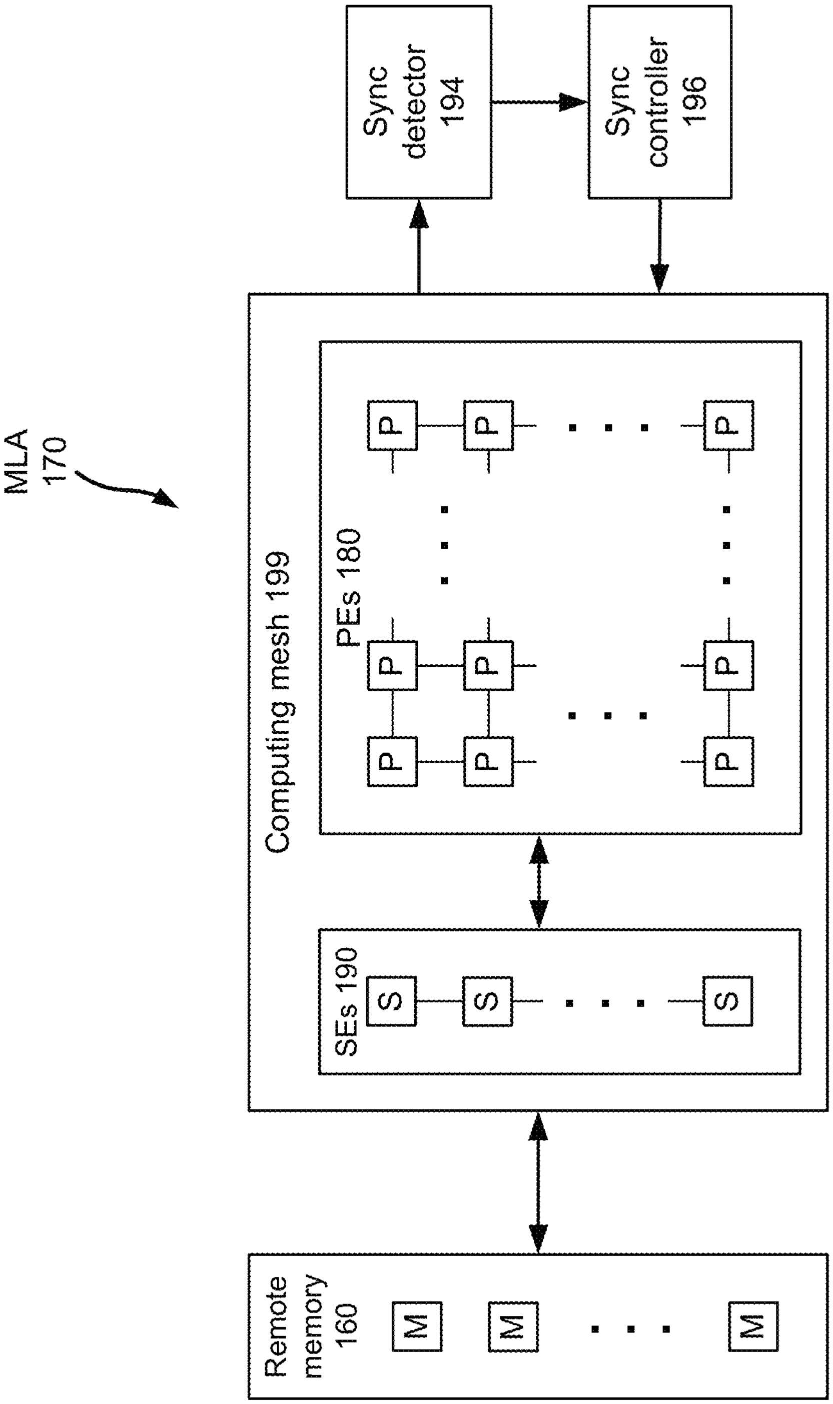
FIG. 1 is a block diagram of a system that synchronizes compute elements in a machine learning accelerator (MLA).

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Machine learning networks (MLNs) are commonly implemented in compute facilities with access to significant resources, such as in the cloud or on server clusters. However, the sources of input to machine learning networks may be located remotely from these large compute facilities. For example, cameras and other types of sensors may be edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras including both still image and video cameras, microphones, temperature sensors, pressure sensors and other types of sensors. The sensors may capture samples that are used as inputs to a computing pipeline within the edge device. Thus, it would be beneficial if MLNs could be implemented in edge devices.

A Machine Learning Accelerator (MLA) is described herein that may be built into an edge device. The MLA executes a machine learning network. As will be described in more detail below, one method of optimizing execution of an MLN is to use a compiler that, prior to run-time, generates a computer program with statically scheduled instructions for executing the MLN. For example, the compiler may determine which instructions are executed by which compute elements in the MLA at what time. Static scheduling enables the compute elements in the MLA to execute the instructions with no run-time conditions, branching or dependencies. This may result in lower power consumption, simpler MLA design, and lower cost.

However, because on-chip memory is limited, the statically scheduled instructions and corresponding data may be stored in off-chip memory and then transferred to on-chip storage elements for consumption by the on-chip processing elements. On-chip memory such as SRAM has a known access time, so data transfers from/to SRAM storage elements to/from processing elements may be statically scheduled. However, SRAM typically has limited space.

Off-chip memory such as DRAM has much more space available, but it has variable access time, so the compiler may not be able to predict when the instructions or corresponding data fetched from the off-chip memory will be ready for execution and cannot statically schedule data and instruction transfers from DRAM. This issue may be compounded if instructions are to be executed by multiple processing elements according to a common static schedule because the compiler assumes that the processing elements are synchronized in their operation. One processing element cannot start execution of its statically scheduled instructions later than another processing element, just because its instructions or data arrived later.

In one approach, a mechanism is used to detect whether sufficient instructions and data have been transferred from off-chip memory to the on-chip storage elements and processing elements in order to fulfill the static schedule. If sufficient instructions or data are not available, then execution of the statically scheduled instructions is suspended until the transfers from off-chip memory catches up sufficiently.

FIG. 1 is a high level diagram of such a system. The system includes a machine learning accelerator 170. The MLA 170 includes a mesh 199 of compute elements, which includes interconnected storage elements (SEs) 190 and processing elements (PEs) 180. Within the computing mesh 199, data can be transferred between the SEs 190 and/or PEs 180 according to statically scheduled data transfer instructions. The PEs 180 perform computations according to statically scheduled compute instructions. These data transfer and compute operations within the mesh 199 are deterministic, meaning that the compiler may determine at compile time how long is required to execute each instruction. As a result, these instructions may be statically scheduled by the compiler for execution by the compute elements 180, 190 within mesh 199.

The system in FIG. 1 also includes an off-chip memory 160. The MLA 170 fetches instructions and data from the off-chip memory 160 for the computing mesh 199. The MLA 170 also transfers data from the computing mesh 199 to the off-chip memory 160. The MLA 170 may do this through a dedicated memory interface, such as a direct memory access (DMA) interface. The time required for these transfers is not predictable enough to be statically scheduled. As a result, it is possible that the compute elements 180, 190 may reach a point in the static schedule where the required instructions or data for some compute element has not yet been transferred from the off-chip memory. If that compute element waits while the other compute elements continue execution, then the elements 180, 190 in computing mesh 199 will no longer be synchronized and the static schedule will be violated.

In FIG. 1, the MLA 170 also includes a sync detector 194 and a sync controller 196. In FIG. 1, the sync detector 194 is shown as a box separate from the computing mesh 199. However, it may be implemented in a distributed fashion as part of each compute element 180, 190. The sync detector 194 determines whether sufficient data and instructions are available for continued operation of the compute elements 180, 190 according to the static schedule. If not, the sync detector 194 generates a request, which for convenience will be referred to as the sync request. The sync detector 194 sends the sync request to the sync controller 196, which suspends operation of the computing mesh 199. In one approach, the compute elements 180, 190 and the static schedule operate according to a clock, and the sync controller 196 suspends operation by temporarily stopping the clock. This may be done by clock gating within the individual compute elements 180, 190.

Figure 2A:
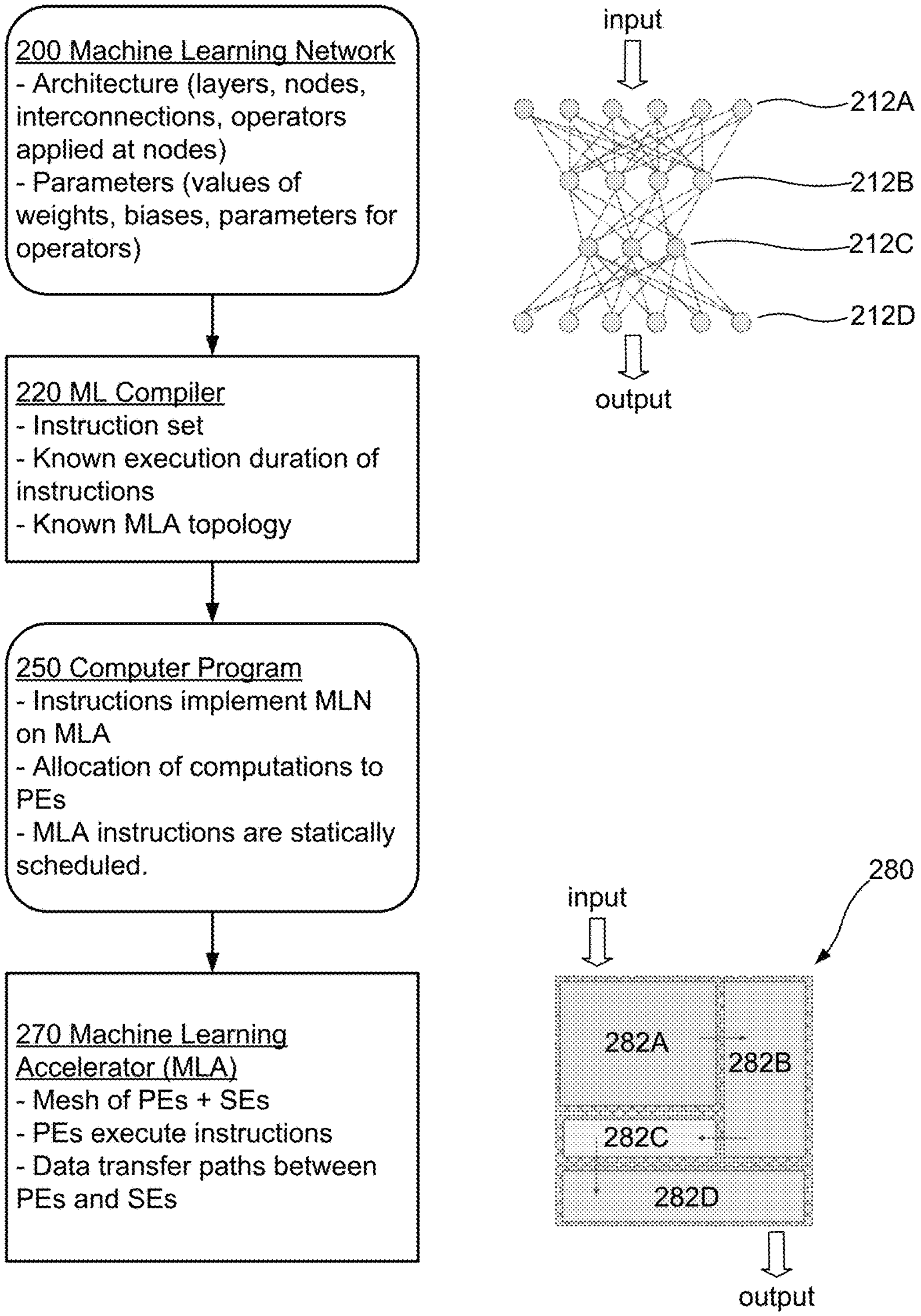
FIG. 2A is a block diagram of a system with a MLA and corresponding compiler.
Figure 2B:
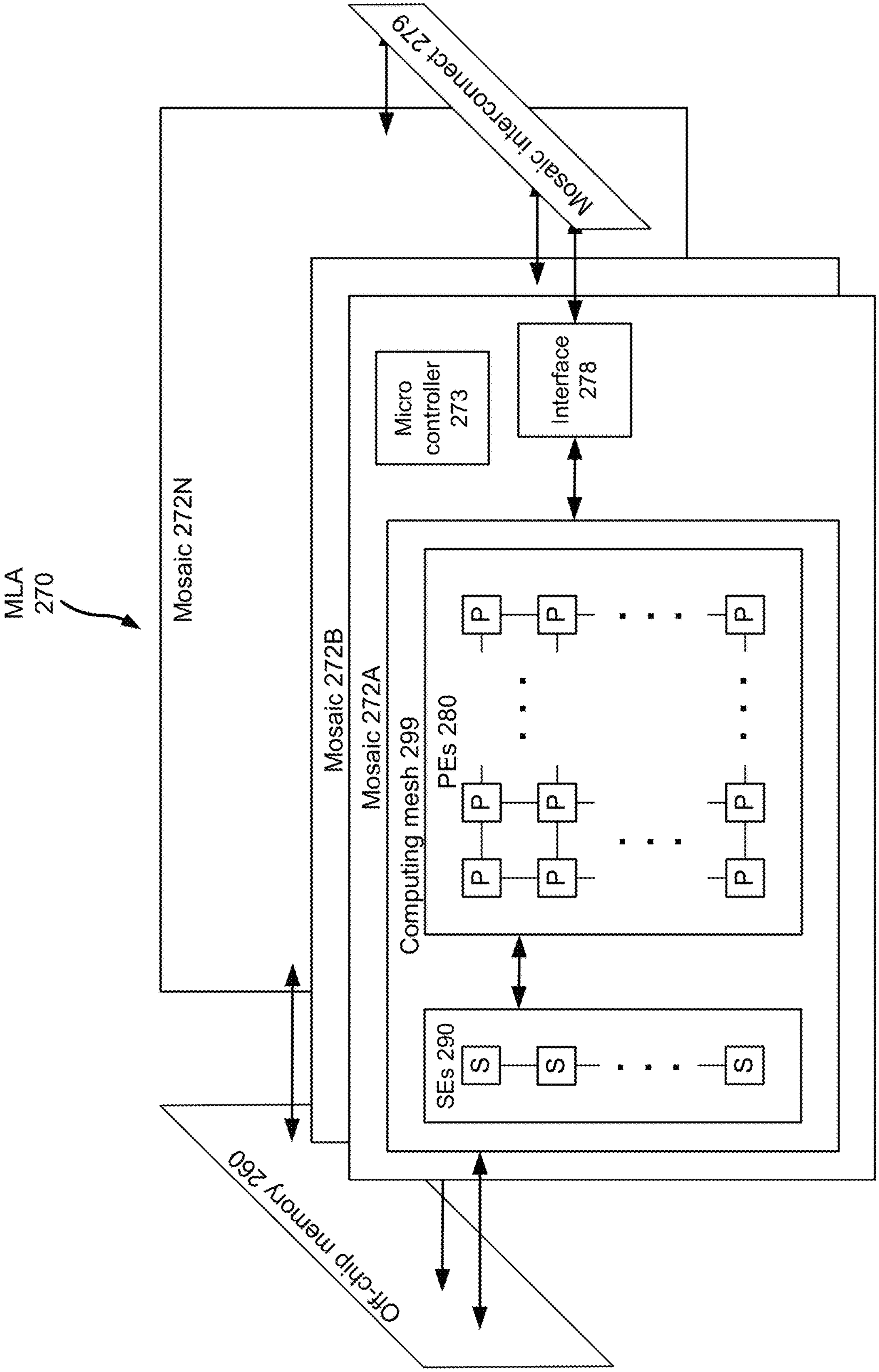
FIG. 2B is a block diagram of a hardware system including an MLA.
Figure 2C:
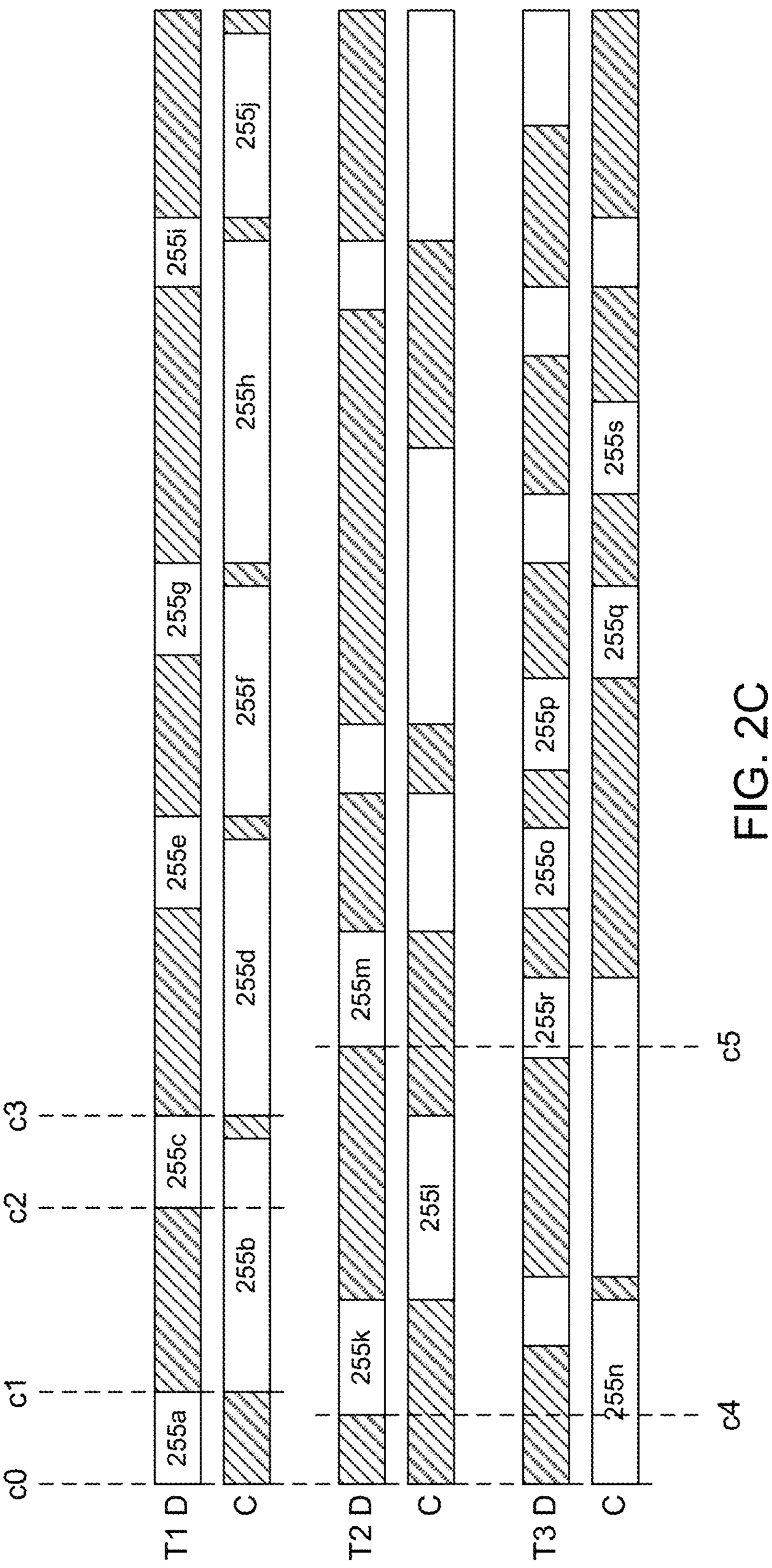
FIG. 2C illustrates execution of a statically scheduled program produced by a compiler.

FIGS. 2A-2C are more detailed descriptions of an example system that executes a statically scheduled program. FIG. 2A is a block diagram of a system with a MLA and corresponding compiler. The MLA may be part of an edge device. The compiler 220 receives a description of a machine learning network 200 and generates a computer program 250 that implements the machine learning network using MLA 270. The computer program 250 includes instructions that are executed by processing elements (Tiles) and/or storage elements (on-chip memory) in the MLA according to a schedule determined by the compiler. Deterministic instructions may be statically scheduled with respect to each other, because the compiler can determine which instructions are executed by which compute elements at what times, as will be explained in greater detail below. For example, for the statically scheduled instructions, there are no conditions, branching or data dependencies that can be resolved only at run-time, and which would affect the timing and order of the execution of the instructions.

Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the static schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 200 may be described by an architecture and parameters. A depiction of an MLN is shown to the right of box 200 in FIG. 2A. Most MLNs include multiple layers 212, each with one or more nodes which are represented by circles in FIG. 2A. The lines between nodes in FIG. 2A represent interconnections between the nodes and layers. Each node calculates a weighted sum of the values received from its connected nodes, possibly also applying a bias. Examples are matrix multiplication and convolution. Each node may also apply certain functionality or operators, such as nonlinear functions (e.g., tanh function), softmax operator, etc. A typical node may compute an output:

$$y=F(\Sigma w_i x_i+b) \quad (1)$$

where $x_i$ are the inputs received from other nodes i, $w_i$ are weights, b is a bias and F( ) is a nonlinear operator. The MLN architecture includes the number of nodes and layers and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 200 or more layers. Examples of inputs include text, images and video. Some of the layers may be fully interconnected where every node in one layer provides input to every node in the next layer. Others may be more locally interconnected, for example to implement convolutions. Each weighted interconnect represents a scalar multiplication. The total number of scalar multiplications required to implement an MLN may be on the order of millions, billions, tens of billions or even more. These may be carried out by matrix multiplications.

The MLA 270 includes a plurality of Tiles 280 and an on-chip memory system with storage elements (not shown in FIG. 2A) implemented on a semiconductor die. The Tiles are organized into one or more meshes of interconnected Tiles. A depiction of a Tile mesh is shown to the right of box 270 in FIG. 2B. In this example, the Tiles 280 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 2A, the computations performed by layers 212A-D are allocated to groups 282A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 220 receives a description of the MLN 200 and generates a computer program 250 that implements the MLN using the MLA 270. The computer program 250 receives an input sample for the MLN and executes the operations of the MLN to produce the output for the MLN. The computer program 250 includes instructions to be executed by the Tiles for implementing computations in the MLN and may also include instructions to be executed by other elements, such as the storage elements of the on-chip memory or a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

The program of statically scheduled instructions may include a series of computations required to implement a portion of the MLN, where the time required for each computation and associated data transfers is known. As a result, the compiler may statically schedule these instructions. The resulting computer program produced by the compiler then implements an allocation of compute instructions to Tiles and a schedule for executing the instructions as determined by the compiler, although these may not be expressly contained with the computer program.

Non-deterministic instructions are also used. For example, non-deterministic instructions may include data fetch and instruction fetch from off-chip memory where the time required to execute the operation varies too much to allow reliable synchronization with other operations. Other examples include computations that occur off-chip, and conditions, branching and other programmatic constructs that depend on values not known until run-time.

FIG. 2B is a block diagram of a hardware system including an MLA 270. The MLA 270 includes all the components shown in FIG. 2B, except the off-chip memory 260. The MLA components are implemented on a single die as part of a single chip. The MLA 270 includes one or more mosaics 272A-N. In this example, all of the mosaics are the same. Each mosaic 272 includes a computing mesh 299 that includes processing elements (PEs or Tiles) 280 and storage elements (SEs) 290. Each mosaic 272 also includes a controller 273, which may include the sync controller 196 of FIG. 1. In FIG. 2A, the overall memory system is a multilevel memory system, which includes a level 1 (L1) memory distributed within the Tiles, a level 2 (L2) memory of SEs 290 which is shared by the Tiles, and the off-chip memory 260. If there are multiple mosaics 272, the MLA 270 may include a dedicated interconnect 279 for connecting the different mosaics. Each mosaic also includes an interface 278 to the interconnect 279. In FIG. 2B, The SEs 290 handle data transfer to and from the off-chip memory 260. The PEs 280 receive instructions from the off-chip memory 260. For convenience, the interface to off-chip memory 260 is not shown in FIG. 2B.

FIG. 2C illustrates execution of a statically scheduled program produced by a compiler. This example shows only instructions executed by PEs (Tiles) but the statically scheduled program typically also includes instructions executed by SEs. Execution of the static schedule begins at some time when all of the Tiles are synchronized, which for convenience is marked as cycle c0 in FIG. 2C. An external controller, such as the sync controller 196, may synchronize the Tiles and start execution of the statically scheduled program when all Tiles are ready.

The example instructions shown in FIG. 2C are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 255*a* transfers data into Tile 1 from either another Tile or from ones of the SEs, and instruction 255*b* then performs a computation that consumes that data. Instruction 255*b* is dependent on instruction 255*a*. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 255*a* is known, the compiler knows when the data will be available (for convenience, marked as cycle c1 in the figure) and can construct a static schedule in which instruction 255*b* starts execution then. The duration of instruction 255*b* is also known, so the compiler knows that compute instruction 255*d* may start after instruction 255*b*. In this case, the compiler determines a static schedule in which instruction 255*d* starts at cycle c3. Compute instruction 255*d* depends on data brought into the Tile by instruction 255*c*. The duration of instruction 255*c* is known, so the compiler knows that in the static schedule, instruction 255*c* must start at cycle c2 or earlier. This pattern is repeated for pairs of data transfer instructions and compute instructions 255*e-f*, 255*g-h*, 255*i-j*.

For Tile 2, compute instruction 255*l* depends on data from data transfer instruction 255*k*. However, instruction 255*k* does not start immediately at cycle c0. Rather, it has a delayed start at cycle c4. This may be because the data transfer path required by instruction 255*k* is occupied by some other data transfer instruction and is not available until cycle c4. The start time of instruction 255*k* in the static schedule is not determined by run-time arbitration or contention mechanisms for the shared data transfer path. Rather, the compiler knows that the data transfer path is occupied since the compiler knows the start times and durations of all the data transfer instructions, so the compiler simply creates a static schedule in which instruction 255*k* does not start until cycle c4 when the compiler knows the data transfer path will be available. Similarly, data transfer instruction 255*m* has a delayed start time. Perhaps the T2 D pipeline is being used to transfer out the results of computation 2551 and does not become available until cycle c5.

For Tile 3, computation 255*n* starts immediately at cycle c0. Perhaps the required data was loaded into Tile 3 during some prior phase. Data transfer instructions 255*o* and 255*p* load data for compute instruction 255*q*. They are separated in time, perhaps because different pieces of data were not available or the data transfer paths were not available until those times. As a final example, data transfer instruction 255*r* loads data for compute instruction 255*s*. In the static schedule, the compiler places instruction 255*r* well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 2C, the computer program may specify that instruction 255*a* executes at cycle c0, instruction 255*b* at cycle c1, instruction 255*c* at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 255*a* will end at cycle c1 and instruction 255*b* is supposed to begin at cycle c1. It may fill the space between cycles c0 and c1 with NO-OPs for the T1 C pipeline. The T1 C pipeline then just continuously executes instructions from its queue, and the NO-OPs ensure that instruction 255*b* is executed according to the compiler's static schedule. In yet another approach, the static schedule may be implemented by hardware. The T1 C pipeline may just stall on the execution of instruction 255*b* until the data from instruction 255*a* is ready. The compiler knows that data will be ready at cycle c1 and, therefore, instruction 255*b* will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

The static schedule of FIG. 2C occurs within the computing mesh 299. The compiler assumes that instructions executed according to the static schedule have been fetched from the off-chip memory 260 in time for their execution, for example, that compute instruction 255*b* has been fetched from off-chip memory by cycle c1, and compute instruction 255*d* has been fetched by cycle c3. Similarly, the compiler also assumes that data used by instructions of the static schedule have also been retrieved from the off-chip memory 260 in time for their consumption. For example, if the data for data transfer instruction 255*a* is coming from off-chip memory, then it has been transferred to the relevant SE or PE by cycle c0, so it can then be transferred by instruction 255*a* to Tile 1. Similarly, the data for data transfer instruction 255*c* has been transferred to the relevant SE or PE by cycle c2.

Figure 3A:
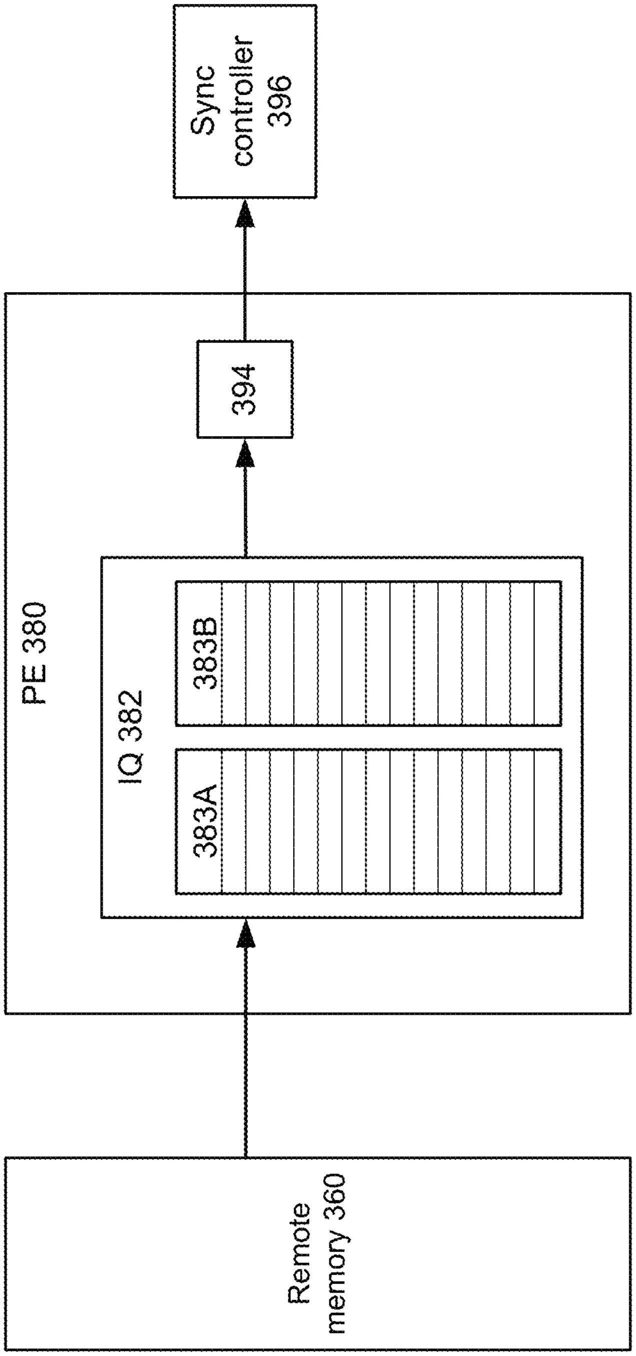
FIG. 3A is a block diagram of a processing element with built-in sync detector and an instruction queue subdivided into sub-queues.
Figure 3B:
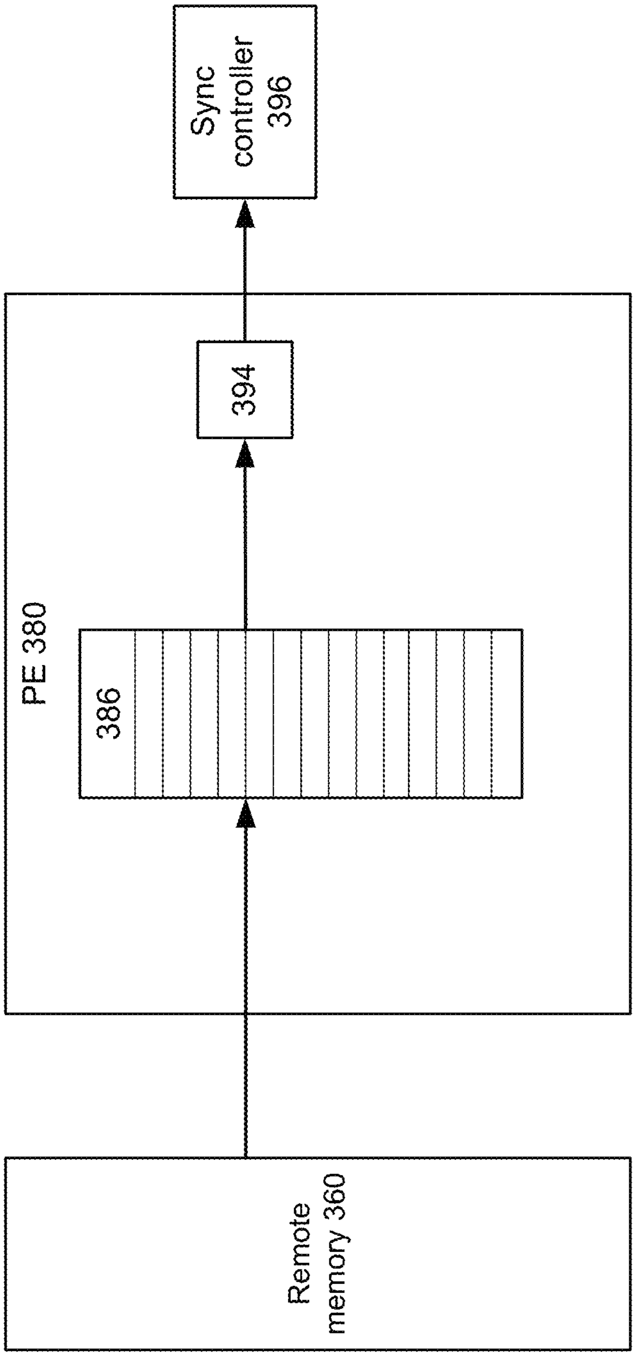
FIG. 3B is a block diagram of a PE with built-in sync detector without sub-queues.
Figure 4:
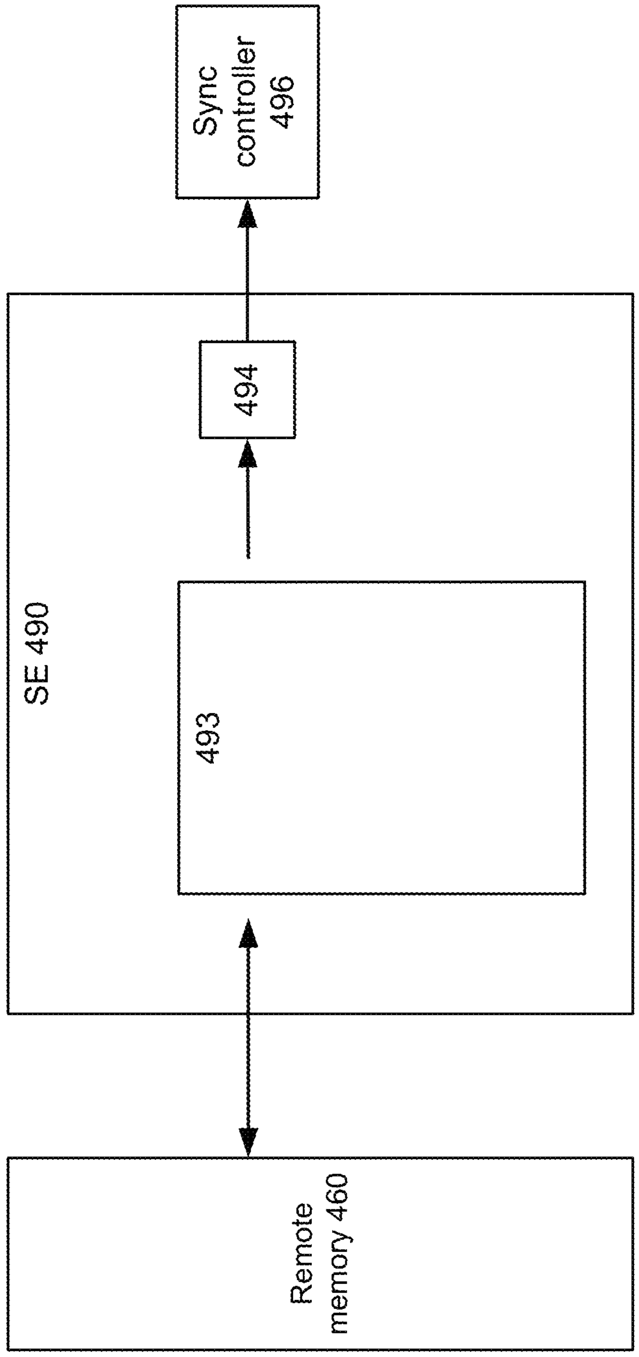
FIG. 4 is a block diagram of a storage element with built-in sync detector.

FIGS. 3-5 show embodiments for maintaining synchronized execution of the static schedule within the computing mesh, in light of the variable time required for transfers between the computing mesh and the off-chip memory. FIG. 3A is a block diagram of a PE with built-in sync detector and an instruction queue subdivided into sub-queues. The PE 380 has an instruction queue 382 that stores the instructions executed by the PE. These instructions are fetched from the off-chip memory 360 via a DMA interface. The instruction queue 382 is subdivided into sub-queues 383A,B. This example shows two sub-queues, but there may be more. The sub-queues alternate in operation. When the PE is executing instructions from sub-queue 383A, new instructions are being fetched and stored into sub-queue 383B. When all of the instructions from sub-queue 383A have been executed, the two sub-queues switch roles. The PE starts to execute instructions from sub-queue 383B and new instructions are fetched and stored into sub-queue 383A.

The PE 380 also includes a sync detector 394, which ensures that the instruction queue 382 stores sufficient instructions to meet the static schedule. In one approach, before execution switches from sub-queue 383A to sub-queue 383B, the sync detector determines whether sub-queue B stores sufficient instructions to meet the static schedule. If not, the sync detector 394 sends a sync request to the sync controller 396 and the sync controller 396 then suspends operation of the computing mesh until enough instructions are stored in sub-queue B.

There may be some latency between the time when the sync detector 394 determines there are not sufficient instructions and the time when operation of the computing mesh is suspended. Assume that this latency takes N cycles. Then the sync detector 394 makes its determination at least N cycles in advance. In one approach, the sync detector 394 may continuously query whether the instruction queue has sufficient instructions for the next N cycles. This is accurate, but may introduce more overhead than is desirable.

An alternate approach makes use of the sub-queues. The test for "sufficient number of instructions" is whether sub-queue B is filled with instructions. This test is performed at least N cycles before the execution of instructions from sub-queue A completes. Different instructions may take different number of cycles to complete. In a simple approach, it is assumed that each instruction must take at least one cycle, so the sync detector 394 queries whether sub-queue B is filled at least N instructions before the instructions from sub-queue A complete execution. For example, if the sub-queues each hold 32 instructions and N=10, then the sync detector 394 makes the query after the first 22 instructions in sub-queue A have executed because the remaining 10 instructions will require at least 10 cycles to complete.

In a more accurate approach, the actual execution time for each instruction is used. For example, if the last two instructions in sub-queue A are scheduled to take 4 and 6 cycles to execute, then the sync detector 394 makes the query after the first 30 instructions in sub-queue A have executed because the remaining 2 instructions will require at least 10 cycles to complete. Other estimates of the execution time of instructions may be used, ranging from the conservative estimate of 1 cycle per instruction to the accurate estimate based on actual execution time.

If the sync detector 394 determines there are insufficient instructions in the queue, it instructs the sync controller 396 to suspend operation of the computing mesh. Transfers from off-chip memory into the instruction queue continue. Once the requisite number of instructions is in the queue (e.g., once sub-queue B is filled), the sync detector 394 signals the sync controller 396 to resume operation of the computing mesh.

At the end of the program, the sub-queue may contain all of the instructions that are available but it may not be full because the end of the program has been reached. In that case, the sync detector 394 does not generate a sync request. Once the end of the program has been reached and the last instruction is loaded into the instruction queue, the sync detector 394 need not continue to test for a sufficient number of instructions.

At the start of the program, it is important that the compute elements start together in order to maintain synchronization. In one approach, the sync detector 394 signals to the sync controller 396 when the instruction queue 382 is filled (or when one sub-queue 383A is filled). When the sync controller 396 receives these signals from all of the compute elements, then it starts execution of the statically scheduled program.

FIG. 3B is a block diagram of a PE with built-in sync detector but not using sub-queues. The PE 380 has an instruction queue 386 that stores the instructions executed by the PE. These instructions are fetched from the off-chip memory 360 via a DMA interface. The PE 380 also includes a sync detector 394, which ensures that the instruction queue 382 stores sufficient instructions to meet the static schedule. The sync detector 394 includes a counter. The sync detector 394 can determine the number of cycles for which it can start execution of instructions. For example, the instructions may have embedded in them the number of cycles before the start of the instruction. As instructions are received into the instruction queue 386, the counter in sync detector 394 is increased by the number of cycles before the start of that instruction. The counter is also decremented according to the clock that governs instruction execution. If the counter decrements to a suitable threshold (e.g., N, or N plus some buffer amount), then the sync detector instructs the sync controller 396 to suspend operation of the computing mesh.

FIG. 4 is a block diagram of a SE with built-in sync detector. The SE 490 transfers data to and from the off-chip memory 460 via a DMA interface. The SE 490 in this example is shown with a single memory bank 493, although the techniques described herein may be used with multiple banks. Data transfer with off-chip memory 460 will be referred to as off-mesh operation or off-mesh mode. It is not statically scheduled. Data transfer to other SEs and PEs will be referred to as intra-mesh operation or intra-mesh mode. It is statically scheduled.

The SE 490 also includes a sync detector 494. In one approach, the sync detector 494 includes a register that stores the states of the bank 493, where the states are (X) data transfer with off-chip memory (off-mesh mode), and (Y) data transfer within the computing mesh (intra-mesh mode). Assume that bank 493 is in state X because data is transferring between bank 493 and off-chip memory. These data transfers may be reads or writes. When all the data transfers are completed, the state is changed from X to Y, indicating that bank 493 is ready for intra-mesh data transfers (i.e., statically scheduled data transfers). When the intra-mesh data transfers are completed, the state is changed from Y back to X, indicating that the sub-bank is now ready for data transfers with the off-chip memory.

Intra-mesh data transfers from PEs (or other SEs) to SE 490 occur as follows. A packet from PE to SE 490 is transmitted with a gap between header and payload. When the header reaches SE 490, the SE determines whether it is in state Y (intra-mesh mode). If so, then the data transfer continues and the payload is also received. However, if the SE 490 is in state X (off-mesh mode), then the sync detector 494 instructs the sync controller 496 to suspend operation of the computing mesh. The payload from the PE is frozen in the computing mesh while the SE 490 continues its off-mesh operations with off-chip DRAM. Once these off-mesh transfers are completed, the state is changed to Y (intra-mesh mode) and the payload transfer to the SE 490 is completed.

Intra-mesh data transfers from SE 490 to PEs (or other SEs) occur as follows. The PE sends a data request to the SE 490. If the SE 490 is in state Y (intra-mesh mode), then it can transfer the data packet to the PE. If the SE 490 is in state X (off-mesh mode), then the sync detector 494 instructs the sync controller 496 to suspend operation of the computing mesh. The data packet is not transferred from SE 490 to the PE until the off-mesh transfers are completed and the SE 490 returns to state Y.

If there is a latency of N cycles before suspending operation of the computing mesh, then the sync detector 494 should make its determination at least N cycles in advance. For example, the time gap between the packet header and packet payload is at least N cycles, and the time gap between the data request and the data packet is also at least N cycles.

Figure 5A:
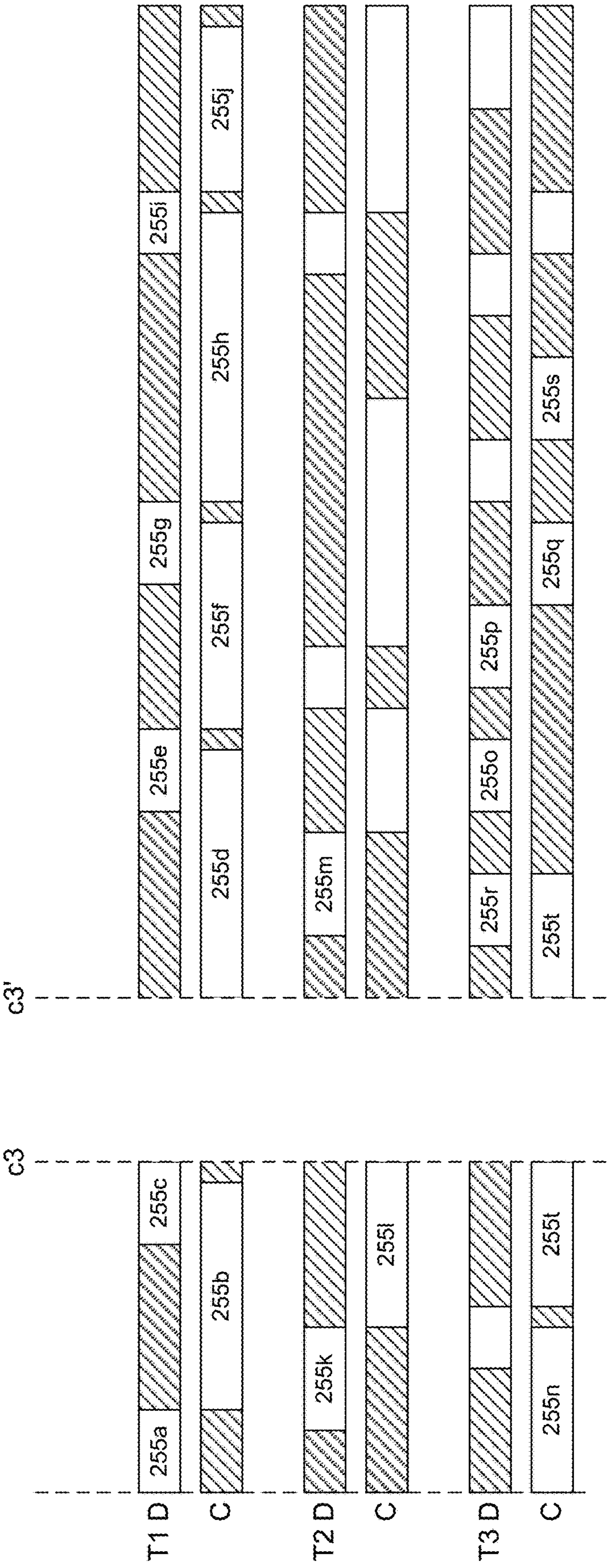
FIGS. 5A-5D show different approaches to suspending execution of a statically scheduled program.
Figure 5B:
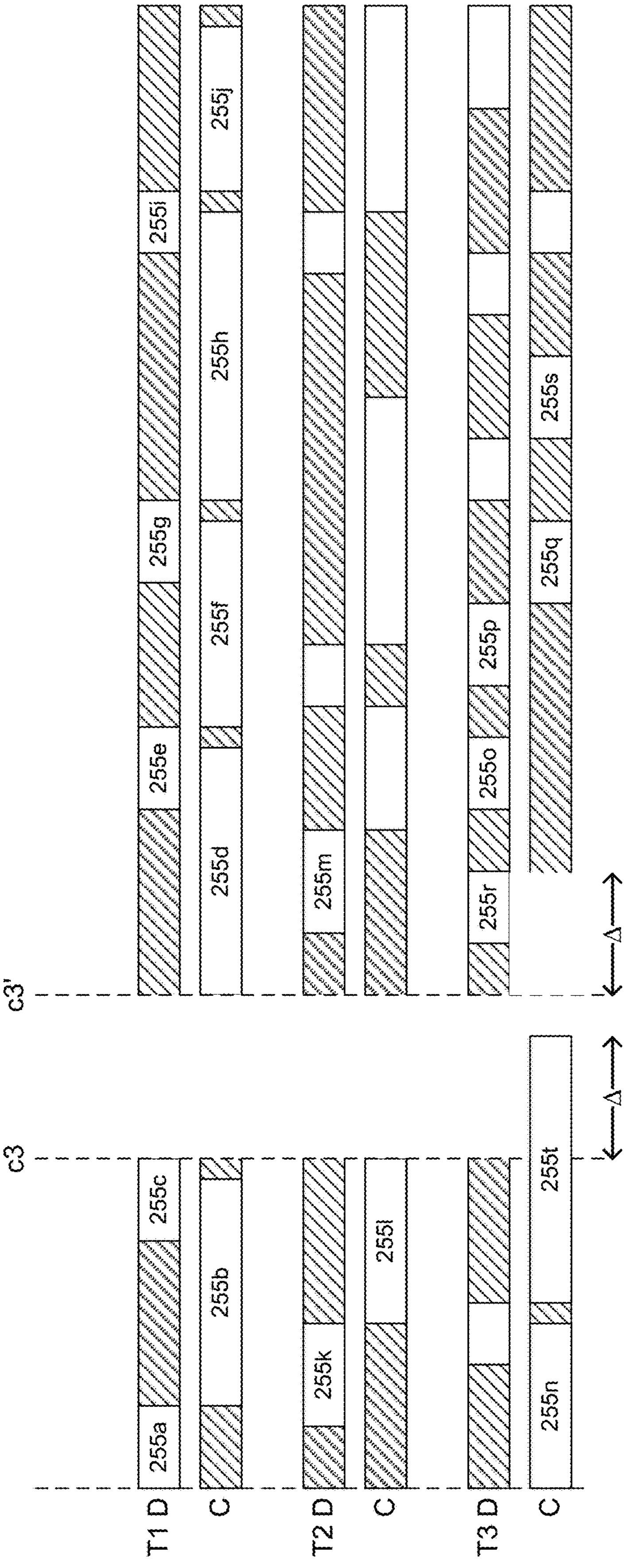
Figure 5C:
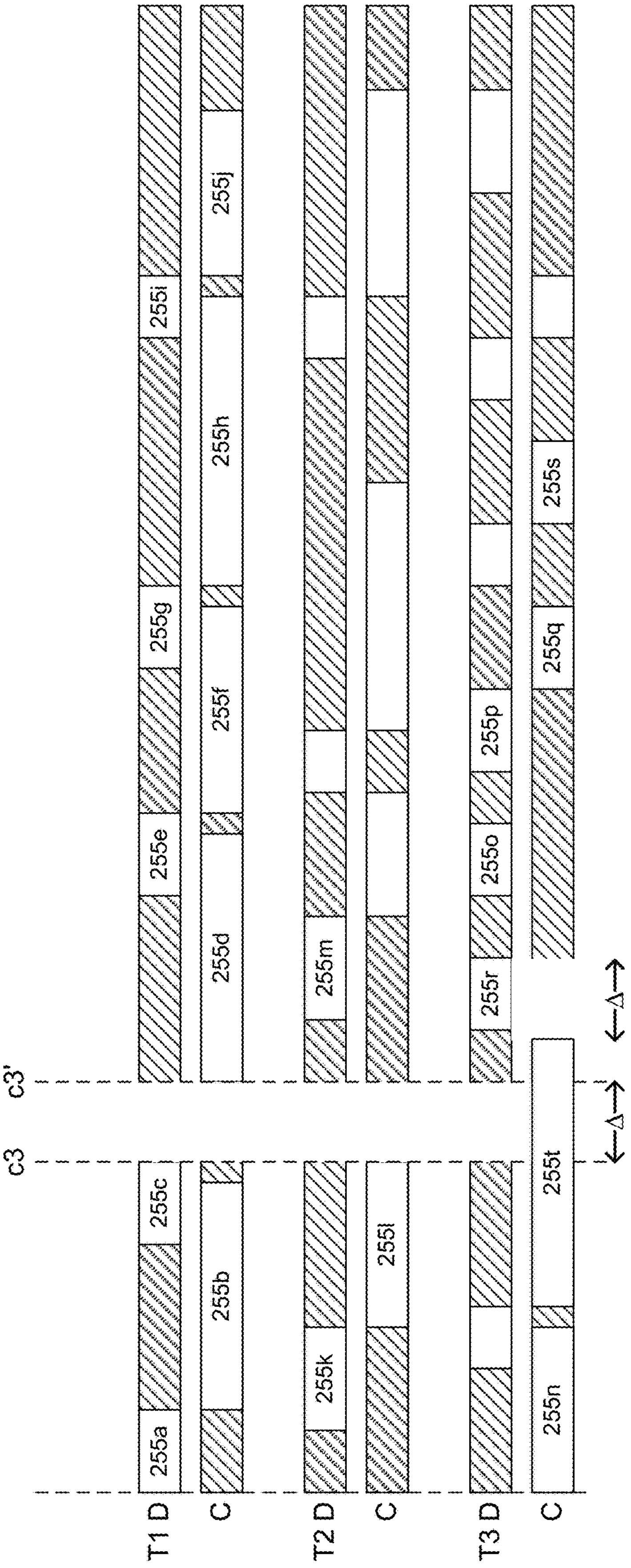

FIGS. 5A-5C show different approaches to suspending execution of a statically scheduled program. These examples are based on the static schedule shown in FIG. 2C. In all of these examples, the compute instruction 255*d* is not available in time and operation is suspended until it becomes available (i.e., it is transferred from off-chip memory to the instruction queue for Tile 1). In FIG. 5A, all compute elements in the mesh are suspended at cycle c3, which is the cycle that requires instruction 255*d*. For convenience, cycle c3 is referred to as the stall cycle. All the compute elements resume operation at a later time when instruction 255*d* becomes available. Note that this later time, denoted c3', is still cycle c3 as far as the statically scheduled program is concerned. The difference is that cycle c3' is delayed in the real world. Note that instruction **255*t*** is stopped mid-instruction and resumes when operation for all compute elements resumes.

Figure 5D:
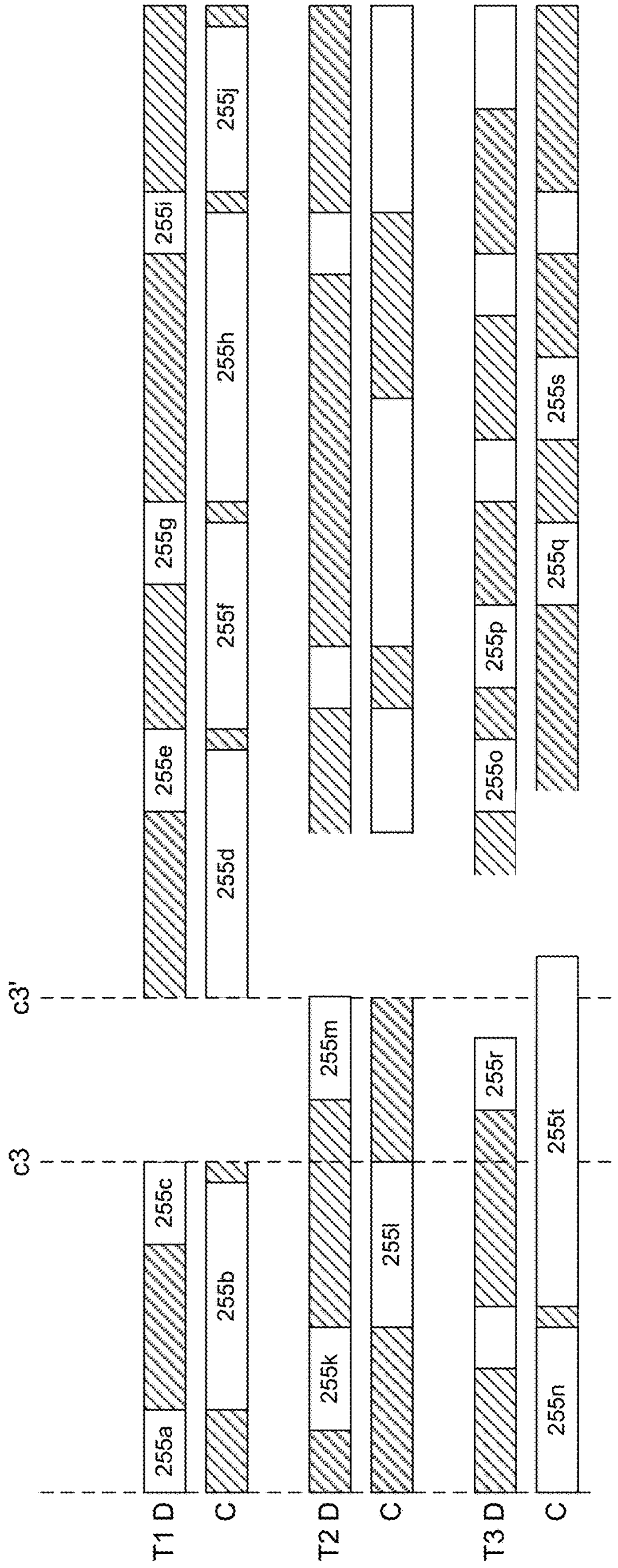

In FIGS. 5B-5D, some compute elements continue to operate beyond the stall cycle c3. In FIGS. 5B and 5C, instruction **255*t* continues to operate because it is a compute instruction which does not affect compute elements outside of tile T3. However, when the other compute elements resume at cycle c3', tile pipeline T3 C waits until the rest of the compute elements catch up so as to remain in synchronization with the other elements. In one approach, a counter is used to count the extra cycles that pipeline T3 C operates between cycles c3 and c3'. In FIG. 5B, instruction 255*t* runs to completion before c3'. It runs A extra cycles. When mesh operation resumes, the counter counts down and the operation of pipeline T3 C is suspended for A cycles until the counter reaches zero. In FIG. 5C, the delay between c3 and c3' is shorter, so instruction 255*t* does not run to completion before c3'. In this case, the counter counts the A cycles for the delay between c3 and c3' and starts counting down after instruction 255*t*** runs to completion. The operation of pipeline T3 C is suspended until the counter reaches zero. This resynchronizes pipeline T3 C with the other compute elements.

In FIG. 5D, all compute elements that are unaffected by instruction **255*d* continue operation. Here, Tiles 2 and 3 continue operation and Tile 1 waits. Once instruction 255*d*** becomes available, Tiles 2 and 3 wait for Tile 1 to catch up. Tiles 2 and 3 do not have to operate for the entire time between c3 and c3'. Different compute elements might continue to operate for different numbers of cycles. In this way, compute elements suspend and resume operation at different times. This avoids a situation where all compute elements stop at the same time and then restart at the same time, which can cause power spikes.

Figure 6:
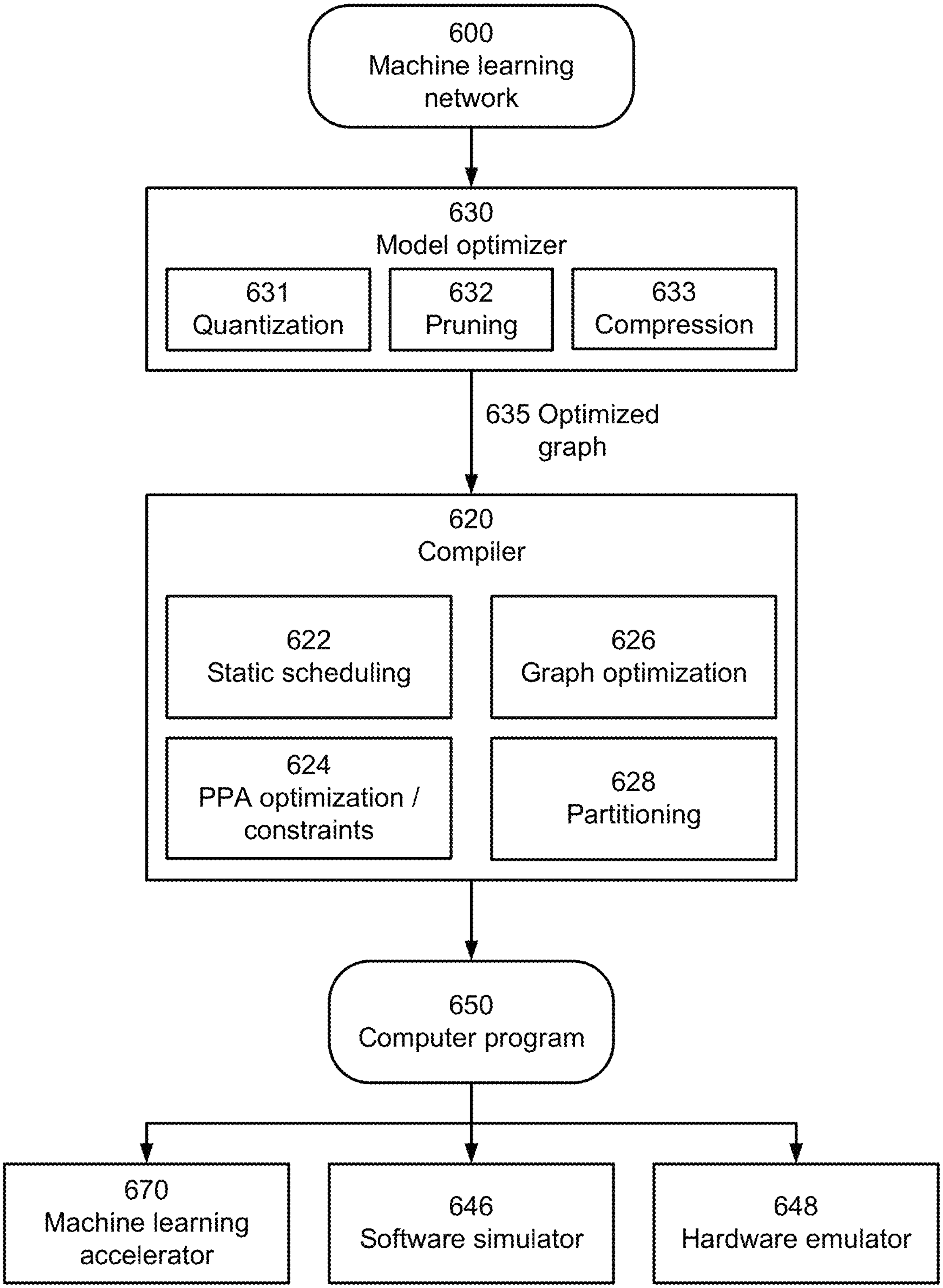
FIG. 6 is a block diagram of a software development environment including a machine learning (ML) compiler.

FIG. 6 is a block diagram of a software development environment including a machine learning (ML) compiler 620. In this example, the software development environment also includes a model optimizer 630. The model optimizer 630 receives a description of the MLN 600 and produces an optimized graph 635 of the MLN. It may apply optimizations such as quantization 631, pruning 632 and/or compression 633. Quantization 631 reduces the resolution of calculated values. For example, floating point values may be quantized to a certain number of bits and then integer math used instead of floating point math. This reduces the complexity and power consumed by the Tiles. Pruning 632 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 635 of the MLN may be expressed as a graph, in which the nodes of the graph represent nodes in the MLN and the edges of the graph represent the weighted interconnects. The compiler 620 receives the optimized graph 635 and produces the resulting computer program 650. The compiler 620 may perform operations including static scheduling 622, PPA (power performance area) optimizations 624, graph optimizations 626 and/or partitioning 628.

In order to statically schedule 622 the deterministic instructions, the compiler typically will know the duration of each instruction (i.e., how long each instruction takes to execute), the capabilities of each element (which processing elements and storage elements can execute which instructions), the topology of data transfer paths to and from Tiles (including between Tiles, and between Tiles and on-chip memory), and the computations required and their dependencies (i.e., the MLN description). With this information, the compiler can schedule unconditional start times for the deterministic instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

PPA optimization 624 includes different optimizations of the computer program 650. For example, the allocation of MLN computations to Tiles may be optimized to reduce power consumption, to increase performance (such as reducing latency or increasing throughput) and/or to reduce area (e.g., number of Tiles used). The compiler 620 may also optimize 624 the computer program 650, subject to constraints on power, performance, area and/or any of the quantities described above. Graph optimization 626 includes analysis of the graph representing the MLN to prune, merge or quantize links, parameters, values, and layers to achieve better performance. Partitioning 628 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 650 may be loaded into memory for execution on a machine learning accelerator 670. For example, one possible application is object detection. In this case, the inputs are images captured by a video camera. The MLN 600 has been trained to identify certain objects in the video images. The computer program 650 implementing the MLN is loaded onto memory that is accessible by the MLA 670, which is implemented as a chip inside the camera. This way, images captured by the video camera may be immediately analyzed by the computer program 650 running on the MLA 670.

In addition to the MLA 670, the computer program 650 or parts of it may be run on a software simulator 646 and/or hardware emulator 648 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 7:
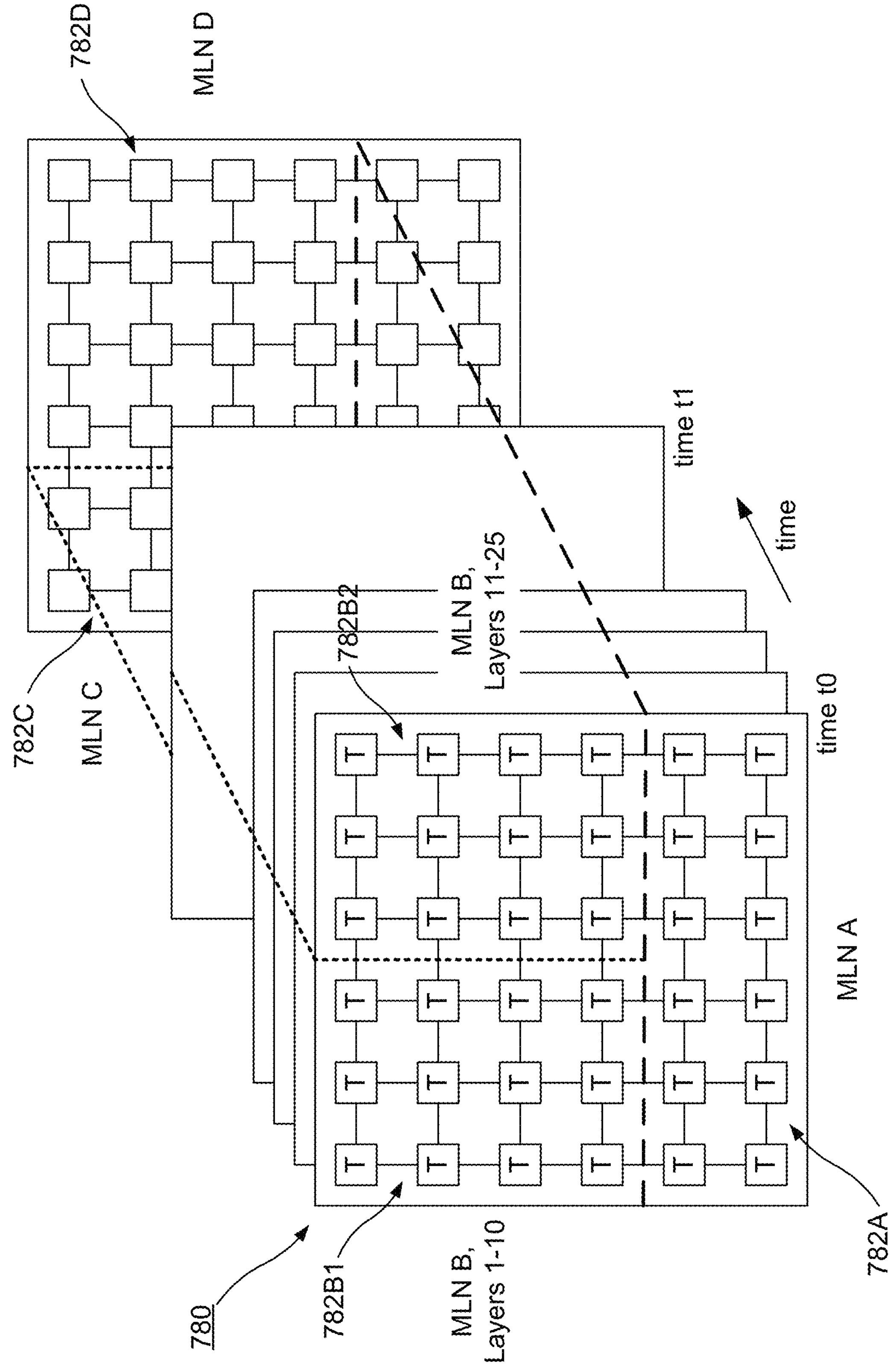
FIG. 7 is a block diagram of an MLA with a 6×6 mesh of Tiles.

The embodiments described above may be used to execute a single MLN. However, the MLA is enabled to execute multiple MLNs. FIG. 7 illustrates partitioning the mesh of Tiles to different subnets of an MLN and to different MLNs. In FIG. 7, the MLA includes a 6×6 mesh (element 780 in FIG. 7A). From time t0 to t1, the mesh 780 is utilized to implement two different MLNs: MLN A and MLN B. The Tiles are divided into three partitions 782A, 782B1, and 782B2. Partition 782A implements MLN A, partition 782B1 implements the first 10 layers of MLN B, and partition 782B2 implements the remaining 15 layers of MLN B. MLN B may be partitioned in this manner because some off-Tile operations may be required between layers 10 and 11. May be the output of layer 10 requires a computation that is performed off-Tile in a non-deterministic manner, or may be layers 11-25 require data that cannot be loaded in a manner consistent with the static scheduling of layers 1-10. After time t1, the mesh 780 continues to implement MLN B using partition 782A, but MLN A is replaced by MLNs C and D using partitions 782C and 782D, respectively.

FIG. 7 shows a progression over time. The front diagram shows the partitioning at an earlier time and the subsequent diagrams show the partitioning at later times. The times are indicated to the lower right of the diagrams. At time t0, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. 11-25. The upper left 4×2 Tiles now implement MLN C, and the upper right 4×4 Tiles now implement MLN D. The different MLNs may execute and maintain synchronization independent of each other.

Figure 8:
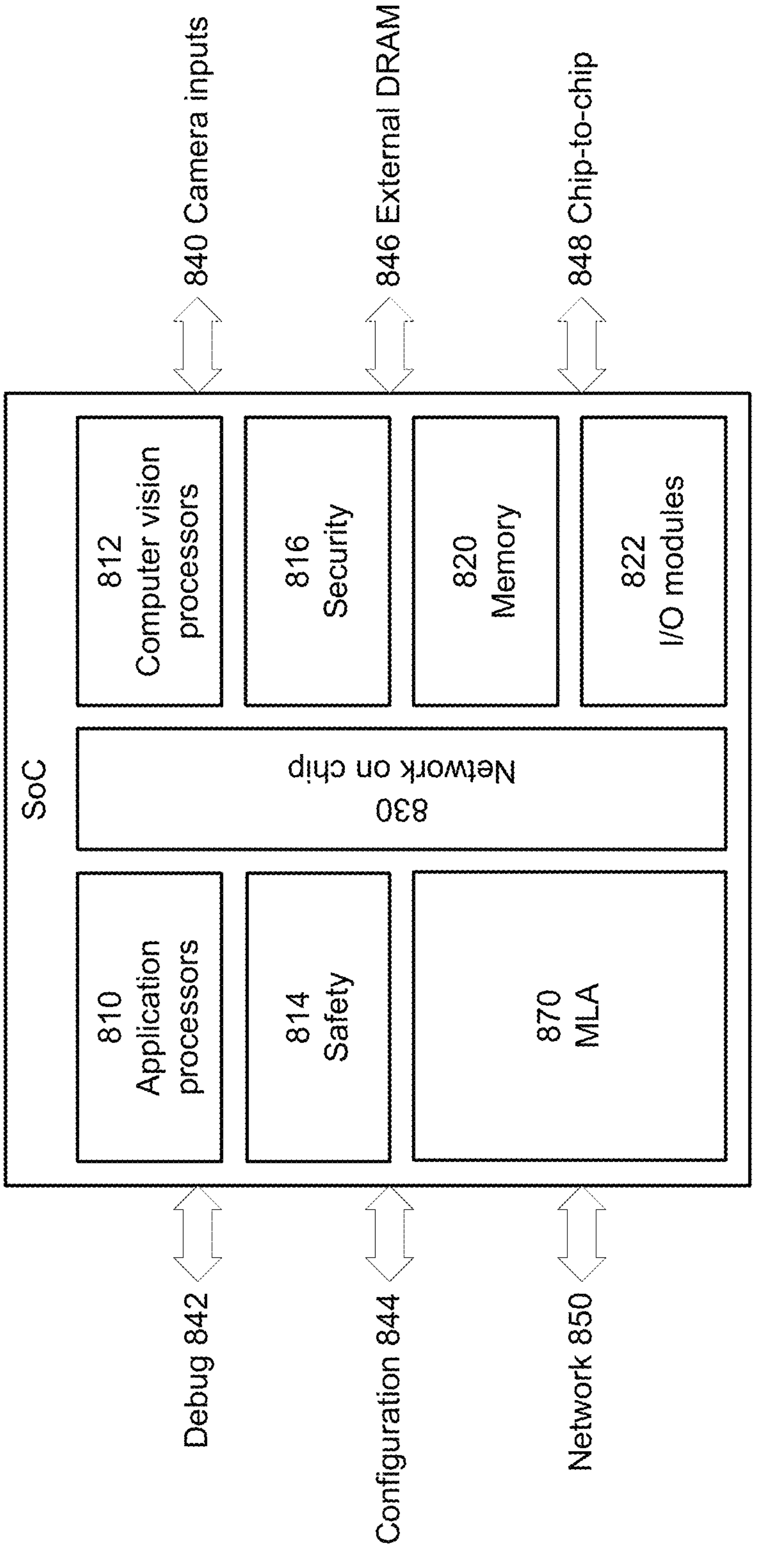
FIG. 8 is a block diagram of an integrated circuit that includes an MLA.

As discussed above, the MLA includes various components that are on the same die. The MLA may be integrated into a larger integrated circuit product (e.g., as part of an edge device). FIG. 8 is a block diagram of an integrated circuit that includes an MLA 870. Other components may be included on the same die as the MLA. This example includes the following additional blocks: application processor 810 (e.g., general purpose CPU running applications), computer vision processor 812 (or other types of application-specific processors), safety 814, security 816, additional SRAM (memory) 820 and input/output circuitry 822. It also includes a network 830 for communication between the different components. This type of semiconductor chip may be referred to as a system-on-chip (SoC).

The connections to the external world include camera inputs 840 for the computer vision processors, ports for debug 842 and configuration 844, a connection 846 to external memory (e.g., DRAM), chip-to-chip connections 848, and network connections 850 (e.g., Ethernet and PCIe).

The SoC of FIG. 8 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 812, which perform initial operations such as edge detection and enhancement, contrast enhancement, motion detection, and optical flow. Raw and/or processed images may be then input to the MLA 870 for analysis by the machine learning network. The MLA may also receive other inputs, such as metadata from other sources and data from other sensors. The application processors 810 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A machine learning accelerator (MLA) implemented on a semiconductor die, the MLA comprising:

a computing mesh of interconnected storage elements (SEs) and processing elements (PEs) configured to execute a program containing a deterministic phase of deterministic instructions to implement a machine learning network according to a static schedule for execution of the deterministic instructions by the SEs and PEs, the deterministic instructions including data transfer instructions for data transfer between the SEs and/or PEs and compute instructions for computations by the PEs; wherein the PEs have instruction queues that store the deterministic instructions for execution by the PEs, and the instruction queues are subdivided into sub-queues;

a memory interface to off-chip memory, wherein the MLA fetches instructions from the off-chip memory into the instruction queues and, for each PE, the deterministic instructions for that PE for the deterministic phase are fetched alternately into the sub-queues for that PE;

a sync detector configured to determine, for each PE, whether a next sub-queue for that PE contains sufficient deterministic instructions to continue execution of the deterministic phase according to the static schedule before execution of the deterministic instructions contained in a current sub-queue for that PE is completed, and to generate a sync request indicating insufficient deterministic instructions to continue execution of the deterministic phase if the next sub-queue does not contain sufficient deterministic instructions to continue execution of the deterministic phase; and a sync controller configured to suspend continued execution of the deterministic phase by the computing mesh in response to the sync request.

2. The MLA of claim 1 wherein the sync detector determines whether the next sub-queue contains sufficient deterministic instructions at a predetermined number of deterministic instructions before the execution of the deterministic instructions in the current sub-queue is completed.

3. The MLA of claim 1 wherein the sync detector determines whether the next sub-queue contains sufficient deterministic instructions at a predetermined number of cycles before the execution of the deterministic instructions in the current sub-queue is completed.

4. The MLA of claim 1 wherein determining whether the next sub-queue contains sufficient deterministic instructions comprises determining whether the next sub-queue is full.

5. The MLA of claim 1 wherein the sync detector is further configured to: after generating the sync request, determine that the next sub-queue contains sufficient deterministic instructions and then generate an instruction for the sync controller to resume operation of the computing mesh.

6. The MLA of claim 1 wherein the sync detector does not determine whether the next sub-queue contains sufficient deterministic instructions if that queue has already received all deterministic instructions for the static schedule.

7. The MLA of claim 1 wherein each PE includes one instruction queue dedicated to that PE, each instruction queue contains two sub-queues, the sync detector comprises circuitry within each PE to monitor that PE's instruction queue and sub-queues, and the sync controller suspends operation of the computing mesh in response to a sync request from any PE.

8. A machine learning accelerator (MLA) implemented on a semiconductor die, the MLA comprising:

a computing mesh of interconnected compute elements that includes storage elements (SEs) and processing elements (PEs), the compute elements configured to execute a program containing a deterministic phase of deterministic instructions to implement a machine learning network according to a static schedule for execution of the deterministic instructions by the compute elements, the deterministic instructions including data transfer instructions and compute instructions;

a memory interface to off-chip memory, wherein the MLA fetches deterministic instructions for the PEs from the off-chip memory and the MLA transfers data between the SEs and the off-chip memory;

a sync detector configured to determine, for each compute element, whether sufficient data and deterministic instructions are available to that compute element for continued execution of the deterministic phase according to the static schedule, and to generate a sync request indicating insufficient data and/or deterministic instructions to continue execution of the deterministic phase if sufficient data and/or deterministic instructions are not available; and a sync controller configured to suspend continued execution of the deterministic phase by the computing mesh in response to the sync request.

9. The MLA of claim 8 wherein the sync request determines a stall cycle for suspending operation of the computing mesh, but some compute elements continuing to operate for cycles beyond the stall cycle.

10. The MLA of claim 9 wherein the compute elements that operate beyond the stall cycle are executing deterministic instructions that are local to those compute elements.

11. The MLA of claim 9 wherein the compute elements that operate beyond the stall cycle are executing deterministic instructions with predefined opcodes.

12. The MLA of claim 9 further comprising:

counters that count the additional cycles during which compute elements operate beyond the stall cycle and then count down the number of additional cycles for those compute elements when the computing mesh resumes after suspension.

13. The MLA of claim 9 wherein suspending operation of the computing mesh has a latency, and determining whether sufficient data and deterministic instructions are available for continued operation occurs with enough lead time to account for the latency.

14. The MLA of claim 8 wherein the compute elements operate according to clocks, and suspending operation of the computing mesh comprises gating the clocks.

15. The MLA of claim 8 wherein the SEs are SRAM, the off-chip memory is DRAM, and the SEs and PEs have DMA access to the DRAM.

16. The MLA of claim 15 wherein the PEs comprise a two-dimensional array of PEs with PEs connected to their adjacent neighbors, and the SEs comprise a ring of SEs around the array of PEs with SEs connected to PEs on a periphery of the array.

17. The MLA of claim 15 wherein the sync detector is further configured to: before execution of the deterministic instructions begins, determine whether sufficient deterministic instructions are available to begin execution according to the static schedule and then generate an instruction for the sync controller to begin execution of the deterministic instructions.

18. The MLA of claim 8 wherein the PEs have instruction queues that store the deterministic instructions for execution by the PEs, the sync detector comprises a counter, the counter is configured to track a number of remaining cycles required to execute the deterministic instructions stored in the instruction queue, and the sync detector is further configured to generate the sync request if the number of remaining cycles falls below a threshold.

* * * * *